April 14, 1964 W. G. A. SCHULZE 3,129,173
CENTRIFUGAL TYPE LIQUID-SOLID SEPARATOR
Filed Aug. 1, 1960 2 Sheets-Sheet 1
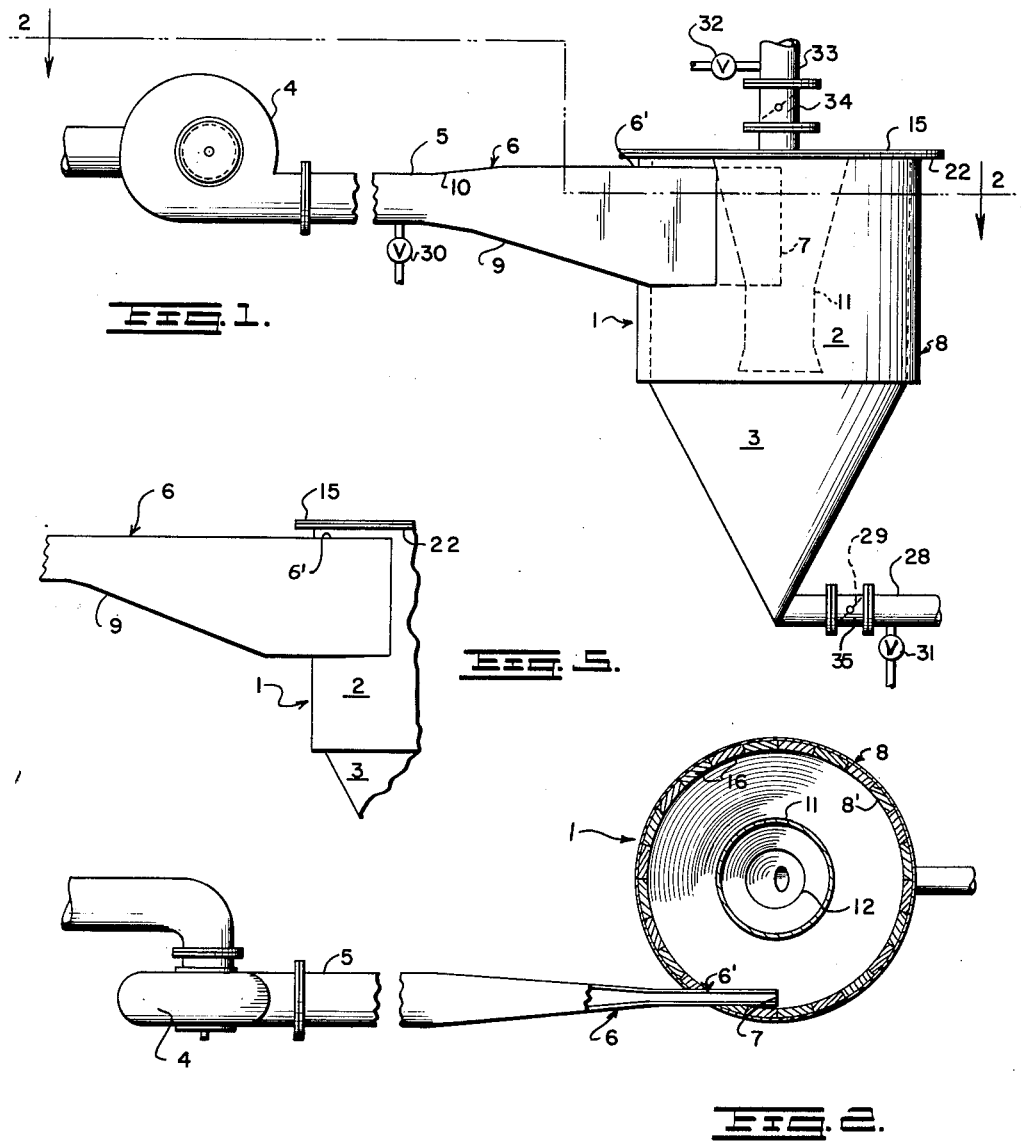
INVENTOR
WILLIAM G.A. SCHULZE
BY James E. Toomey
ATTORNEY

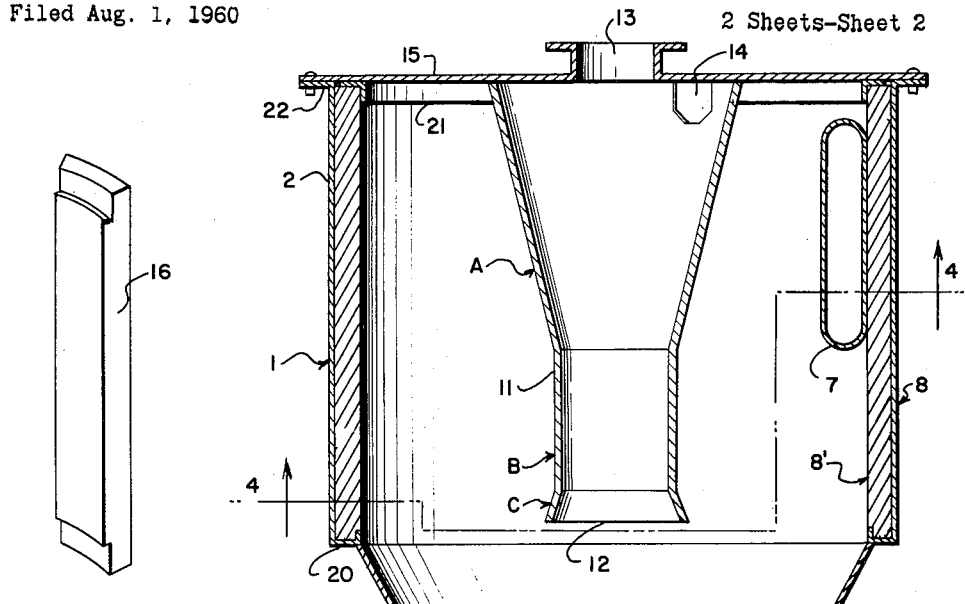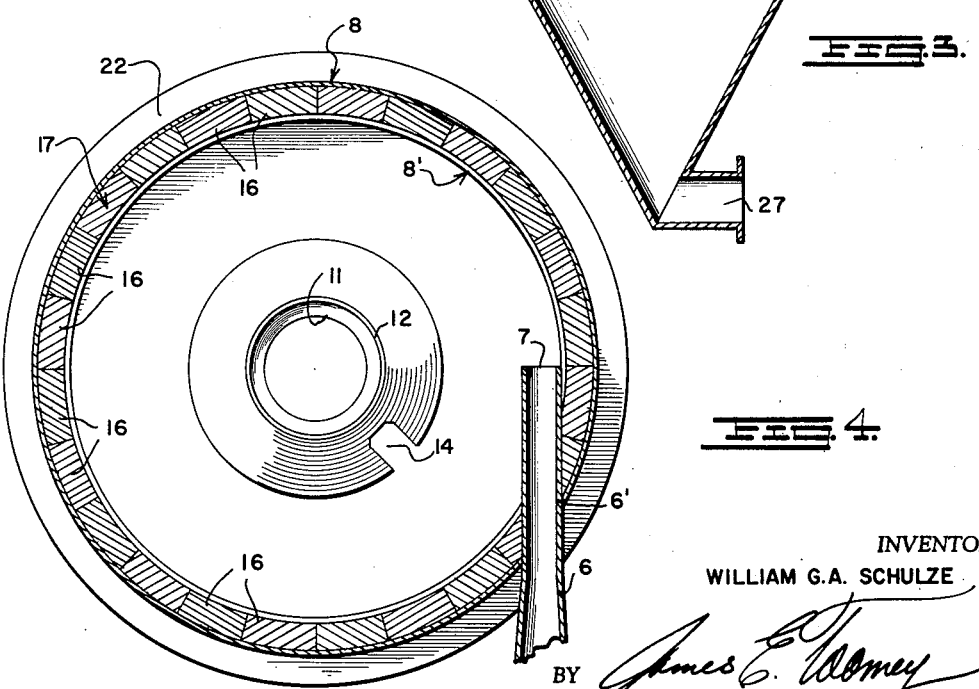

United States Patent Office  3,129,173
Patented Apr. 14, 1964

3,129,173
CENTRIFUGAL TYPE LIQUID-SOLID
SEPARATOR
William G. A. Schulze, Ontario, Calif.; Hertha M.
Schulze, executrix of said William G. A. Schulze,
deceased
Filed Aug. 1, 1960, Ser. No. 46,575
1 Claim. (Cl. 210—512)

This invention relates to devices for separating liquids from solids. More particularly, it is concerned with an improved device for separating liquids from solids in suspension therein which utilizes centrifugal force and the difference in specific gravity of the solids and the liquids to separate the same.

In centrifugal type liquid-solid separators which have been used heretofore, a liquid with solids in suspension is usually introduced into a vessel in a tangential fashion so as to cause a circular motion of the material which tends to throw the solids by centrifugal force towards the outside wall of the vessel. These solids then sink down towards the bottom of the vessel and finally leave through a suitable outlet, generally in the form of a slurry. The liquid with most of the solids removed is discharged from the upper portion of the vessel. Because of the particular construction and mode of operation of these prior art devices, efficient control of separation was not always possible.

Another problem encountered in these prior art separators was one of wall erosion. The most critical area of the wall where erosion occurred was the place where the introduced liquid-solid stream tangentially hits or strikes the wall of the separator and the linear movement of the incoming stream was changed to a circular movement.

Accordingly, it is a primary purpose of this invention to provide an improved apparatus for separating liquids from solids suspended therein whereby erosion of the wall areas of a separating vessel is minimized and efficient control of the separation of liquids and solids obtained.

The various advantages of the instant invention will become more apparent from a review of the following detailed description when taken in conjunction with the appended drawings, wherein FIG. 1 is an elevational view of a liquid-solid separator device that can be used in practicing the instant invention and shows the general arrangement thereof;

FIG. 2 is a partial sectional view taken generally along the line 2—2 of FIG. 1;

FIG. 3 is a cross-sectional view of the liquid-solid separator vessel shown in FIG. 1;

FIG. 4 is a cross-sectional view taken generally along the line 4—4 of FIG. 3;

FIG. 5 is a fragmentary view of a modified nozzle means used for introducing a liquid-solid stream into the separator vessel of FIG. 1; and FIG. 6 is a perspective view of a novel wear-resistant liner segment that can be used to line the vessel employed in practicing the instant invention.

At the outset it is to be observed that, although the apparatus of the instant invention can be advantageously used to separate various kinds of liquids and the solids suspended therein, it will be described with particular reference to its use in separating an acid liquor from ammonium salt crystals suspended therein.

With further reference to the drawings and in particular FIG. 1, the liquid-solid separating apparatus of the instant invention is generally comprised of a separator vessel 1. The upper part 2 of the vessel is generally cylindrical and the lower part 3 of the vessel is generally in the form of an inverted cone.

A liquor with crystals in suspension is pumped by means of a variable speed pump 4 through a length of pipe 5 into the upper part 2 of the separator vessel 1. The shape of pipe 5 gradually changes in horizontal cross section starting at a point adjacent the vessel 1 until it has the shape of a flattened nozzle 6. The vertical cross section of the nozzle is elongated and the horizontal cross section of the nozzle is shallow or narrow in comparison. In other words, one cross-sectional dimension of the nozzle can be considered as being substantially greater than any other cross-sectional dimension of the nozzle. This nozzle terminates in a vertically elongated discharge section 6' provided with a discharge orifice 7 which is arranged tangentially to the inside surface 8' of the outer wall 8 of the vessel 1 with the largest cross-sectional area of the orifice 7 being substantially parallel to this wall surface. Due to the cross-sectional configuration and disposition of discharge orifice 7, liquor and salt crystals in suspension are directed in the form of a thin band or spray against and substantially parallel to the inside surface of wall 8. The cross-sectional area of the discharge orifice 7 is advantageously equal to or less than the over-all cross-sectional area of the pipe or conduit 5. If the cross-sectional area of the discharge orifice 7 were larger than that of the pipe 5, this would effect a slowing down of the material entering the separator. The loss of velocity of the material would result in less centrifugal force being developed inside the vessel with the over-all result that inefficient separation would take place.

The configuration of nozzle 6 is such that the lower throat portion 9 thereof gradually tapers downwardly at a suitable angle. The upper throat portion 10 of the nozzle can also be somewhat tapered if desired. By virtue of the tapered configuration of the portion 9 of the nozzle, the salt crystals which are heavier than the acid liquor in which they are suspended will tend to initially move towards the bottom of orifice 7. This settling action tends to assist in the over-all separation of the liquor and the salt crystals when they are introduced as a single stream into the vessel 1. As the liquor with salt crystals in suspension is ejected from the discharge orifice 7, most of the salt crystals in suspension will be located in the lower portion of the entering stream which impinges against the wall of the vessel in the form of a vertically elongated and horizontally narrow sheet or band. This causes the salt crystals to be ejected into the vessel in a generally downward slanting circular path. While the larger and heavier salt crystals stay close to the inner wall surface 8' due to centrifugal force, the liquor with varying amounts of smaller, lighter salt crystals in an amount which can be controlled, as will be described more fully hereinafter, is guided in its downward path by baffle 11. Baffle 11 can be advantageously conically shaped for about two-thirds or a major portion of its length or at the part A. Part A thus has the shape of an inverted cone. Part B of baffle 11 has the shape of a cylinder which is flared outward at the end C. The outward flare C guides any crystals in the whirling stream towards the slanting sides of the cone and creates a relatively quiet zone below the mouth of the baffle. This baffle is arranged within the vessel in concentric relationship with respect to the outer wall 8. Baffle 11 is provided with a liquid inlet or opening 12 at the bottom thereof and a liquid outlet or opening 13 at the top. The material being discharged into the vessel 1 through orifice 7 is guided by the baffle means 11 towards inlet 12 whence it travels upward at a greatly reduced velocity through the baffle until it finally exits through central outlet 13. The area of inlet 12 can be advantageously made approximately three times the area of the outlet 13. Because of this difference in size between the two openings, the velocity of the liquid entering the cone or baffle 11 will be slowed down so that less solids are carried along by mechanical action. The shape of baffle 11 converging towards the lower cylindrical part forces the whirling liquid to follow a converging downward course leaving the solids at the outer wall by centrifugal action. Then, while the liquid whirls around the cylindrical part of baffle 11 still on a downward course, more solids move to the outer wall and sink. The cylindrical part B of baffle 11 is advantageously flared outward at an angle of approximately 20° at opening 12. The flared end C directs the downward moving, whirling liquid slightly outward creating a quieter zone directly below the baffle opening 12 where the flow of liquid changes direction upwards towards outlet 13. Due to this flow pattern, superior separation of liquid and solids is achieved.

Since the material which is introduced into the vessel 1 frequently carries entrained gases, some means must be provided for removing these gases. These gases also generally rise to the top of the separator and if not disposed of would get trapped in the area between the baffle and the outer wall, thereby gradually displacing all liquid down to the baffle opening 12. To prevent this a vent or opening 14 is advantageously provided in the upper part of the baffle 11 adjacent to the cover 15 of the vessel for the purpose of venting off the entrained gases. Since opening 14 is in open communication with opening 13, the entrained gases pass through the opening 14 and leave with the liquid at the central outlet 13. As indicated particularly in FIG. 4, this vent 14 is advantageously located approximately at a predetermined point back from the discharge orifice 7 such as 10°. It is at this point or location in the vessel where the least amount of salt crystals are in suspension. By virtue of this particular arrangement, only the smallest amount of salt crystals will ever pass with the liquid through opening 14 to the central outlet 13. During operation of the separator, it has been found that only a negligible amount of liquid continuously bypasses through this vent opening 14 taking the entrained gases with it.

In a further advantageous embodiment of the invention and to minimize the erosion effects of solids impinging against the wall 8 of the vessel, a unique installation of sectionalized wear plates or wall segments is used. In one instance, these wear plates can take the form of the segmented elements 16 indicated in FIG. 6. These wear plates form an interior lining 17 and can be of an arcuate configuration corresponding to the shape of wall 8 and they can be of any length. They can be formed from any suitable abrasion-resistant material, such as neoprene; synthetic rubber; nylon; various plastic materials; silicon carbide or Carborundum; "Stellite," a non-ferrous abrasion-resistant metal material sold by Haynes Stellite Co., a Division of Union Carbide Corp., Kokomo, Indiana; and "Abresist," a fused basalt sold by Basalco Co., Wilmette, Illinois. In any event, these plates should be made from an acid-proof material which resists abrasion and the plates are removably mounted in the walls of the vessel. They can also be made of any suitable refractory material. Suitable means are used for removably mounting the plates such as retaining ring 21 and retaining shelf 20. The plates 16 are slightly wider at the back so that when installed they provide a cylindrical wear-resistant lining one or more inches thick for the inner surface 8' of wall 8. The wear plate sections may be stepped, if desired, at the top and bottom, as indicated in FIG. 6, so that they can rest at the bottom on an approximately circular retaining shelf 20 in abutting relationship to each other. An angular and angle-shaped ring member 21 is inserted from the top after all wear plate sections have been placed on the retaining shelf 20. The angular ring is used to hold the segments in place at the top of the vessel when the top cover is bolted or otherwise secured to the top flange 22 on vertically disposed wall 8. The angular ring fits into the upper step of the wear plate sections 16 and can be lifted out for exchanging or replacing the sections. Thus, it is possible to remove individual plates or segments from places where they get the most wear and to exchange them with sections which have little if any wear so as to even the wear on each section and thereby prolong the life of each individual wear plate or section 16. The individual sections can also be turned upside down to even out the wear between the upper and lower parts thereof.

The conical section 3 of vessel 1 is provided with a discharge outlet 27 which is connected to piping 28. Located in line or piping 28 is valve 29. Valved sampling connections 30 in line 5, 31 in line 28, and 32 in line 33, the latter of which is connected to the outlet 13, provide a convenient means for the operator to take control samples of the acid liquor with ammonium salt crystals in suspension at three critical points. By allowing the liquor with salt crystals in suspension to settle in a gradual manner to the bottom or conical portion 3 of the vessel 1, it is possible to determine the crystal percentage and observe the crystal size at different valve settings. By manipulating the flow valve 34 in line 33 at the outlet portion of the vessel 1 and flow valve 35 in line 28 at the bottom of the vessel 1 and, if necessary, adjusting the flow rate of the pump 4, any desired operating condition can be achieved. The flow of liquid with solids in suspension to the separator can be conveniently adjusted by the variable speed pump. The flow of acid liquor out of the central opening in the top of the separator can be adjusted by opening and closing the valve 34, and the flow of salt crystals in slurry form from the bottom of the vessel can be adjusted by opening and closing valve 35.

The particular shape of the tangential inlet or orifice 7 ejects acid liquor and salt crystals in a fluid sheet generally parallel to the wall with the crystals being suspended in the lower part. This makes separation more efficient as the solids are already closest to the wall and only the fluid or liquor with the finer particles tends to move to the center. By locating the inlet or discharge orifice 7 at a point remote from the inlet 14, the removal of any entrained gases is enhanced.

Finally, the interchangeability of wear plates insures longer life for the total lining. Individual wear plates added near the point of impact such as at the discharge orifice 7 can be exchanged with little worn wear plates taken from a point on wall 8 just behind the inlet 7, etc., until all are worn evenly. If the lower part of any wear plate erodes more than the upper part, the wear plate can be removed, turned upside down, and reinstalled so as to expose the little worn upper half to the more concentrated slurry in the lower part of the cylindrical section of the separator vessel 1.

An advantageous embodiment of the invention has been herein disclosed and described. It is obvious that various changes and modifications may be made therein without departing from the spirit and scope thereof as defined in the appended claim, wherein what is claimed is:

An apparatus for separating solids from a liquid in which they are suspended comprising the combination of a closed vessel provided with a cover and an outer wall, conduit means for introducing a stream of liquid with solids in suspension into the upper part of said vessel, said conduit means including a nozzle projecting into said vessel and disposed tangentially to the outer wall thereof, said nozzle having a vertically elongated discharge orifice, baffle means, a substantial portion of which is in the form of an inverted cone having dependent therefrom a cylindrical section, the terminal portion of which is flared outwardly, disposed within said vessel in concentric relationship to said outer wall and affixed to and closed at its upper end by the vessel cover, said baffle means being of a shorter length than said outer wall and having an opening at the bottom thereof for receiving liquid separated from at least a major portion of the solids in the stream of liquid with solids in suspension that is initially introduced into said vessel, said baffle means also having a supplemental opening in the upper wall thereof adjacent the vessel cover and rearwardly of the discharge orifice for venting gases entrained in the stream of liquid with solids in suspension initially introduced into said vessel, and a central outlet in the vessel cover in open communication with the interior of the baffle through which said separated liquid and vented gases are discharged, the bottom opening of said baffle means being substantially larger than the top outlet therefrom, and outlet means at the bottom of the vessel for discharging the major portion of the solids removed from the stream of liquid with solids in suspension introduced into said vessel.

References Cited in the file of this patent

UNITED STATES PATENTS

| | | |
|---|---|---|
| 2,010,435 | Matheson | Aug. 6, 1935 |
| 2,364,799 | Laughlin et al. | Dec. 12, 1944 |
| 2,698,672 | Burnside et al. | Jan. 4, 1955 |
| 2,731,147 | Krebs | Jan. 17, 1956 |
| 2,735,547 | Vissac | Feb. 21, 1956 |
| 2,816,658 | Braun et al. | Dec. 17, 1957 |
| 2,878,934 | Tomlinson | Mar. 24, 1959 |
| 2,929,501 | Fenske et al. | Mar. 22, 1960 |

FOREIGN PATENTS

| | | |
|---|---|---|
| 507,078 | Belgium | Nov. 30, 1951 |